United States Patent [19]

Zdunek et al.

[11] Patent Number: 4,992,783

[45] Date of Patent: Feb. 12, 1991

[54] METHOD AND APPARATUS FOR CONTROLLING ACCESS TO A COMMUNICATION SYSTEM

[75] Inventors: Kenneth J. Zdunek, 428 Linsey Ave., Schaumburg, Ill. 60194; Philip A. Bieri, 4345 Mumford Dr., Hoffman Estates, both of Ill. 60195; Eric R. Schorman, 1304 Wedglea Dr., Bedford, Tex. 76021.

[73] Assignee: Motorola, Inc., Schaumburg, Ill.

[21] Appl. No.: 176,951

[22] Filed: Apr. 4, 1988

[51] Int. Cl.$^5$ .............................................. H04Q 9/00
[52] U.S. Cl. ...................... 340/825.340; 340/825.31; 380/46
[58] Field of Search ................ 340/825.34, 825.31, 340/825.5, 825.3; 235/380, 382, 382.5; 380/3, 21, 23, 25, 46; 379/85

[56] References Cited

U.S. PATENT DOCUMENTS

| | | | |
|---|---|---|---|
| 4,218,738 | 5/1978 | Matyas et al. | 340/825.31 |
| 4,268,715 | 5/1981 | Atalla | 235/380 |
| 4,295,039 | 10/1981 | Stuckert | 235/380 |
| 4,310,720 | 1/1982 | Check, Jr. | 340/825.31 |
| 4,348,696 | 9/1982 | Beier | 358/188 |
| 4,445,712 | 5/1984 | Smagala-Romanoff | 283/75 |
| 4,481,384 | 11/1984 | Matthews . | |
| 4,581,486 | 4/1986 | Matthews et al. . | |
| 4,590,470 | 5/1986 | Koenig | 340/825.31 |
| 4,596,985 | 6/1986 | Bongard et al. | 340/825.69 |
| 4,602,129 | 7/1986 | Matthew et al. . | |
| 4,623,919 | 11/1986 | Welch | 358/118 |
| 4,626,845 | 12/1986 | Ley | 340/825.48 |
| 4,630,201 | 12/1986 | White | 340/825.34 |
| 4,654,481 | 3/1987 | Corris et al. . | |
| 4,672,533 | 6/1987 | Noble et al. | 340/825.34 |
| 4,802,217 | 1/1989 | Michener | 379/85 X |

FOREIGN PATENT DOCUMENTS

0147837A2 7/1985 United Kingdom .
2120821B 8/1985 United Kingdom .

Primary Examiner—Donald J. Yusko
Assistant Examiner—Edward C. Holloway, III
Attorney, Agent, or Firm—Wayne J. Egan

[57] ABSTRACT

All subscribers operating within a communication system initially generate and transmit a random password and their ID code to the operation (control) center of a communication system. Thereafter, in a first embodiment, subscribers are commanded to modify (in a predetermined manner) and re-transmit their password and ID code either periodically or upon requesting access to the communication system. The modified password is retained as the current (authorized) password by both the subscriber and the system. In a second embodiment, subscribers are commanded to generate and transmit a new random password and their ID code to the system, which maintains a history of each subscriber's current and previous passwords. According to the invention, some of the subscribers having an unauthorized (duplicated) ID code may be inactive (off) when the subscriber is commanded to modify or generate a password. In this way, one of the subscribers having an unauthorized (duplicated) ID code will become out-of-sync with the system, and eventually transmit an unauthorized password. When the system receives an incorrect password for an out-of-sync subscriber, access to the communication system may be denied, and the subscribers that duplicate (or permit others to duplicate) ID codes may be identified.

14 Claims, 6 Drawing Sheets

METHOD AND APPARATUS FOR CONTROLLING ACCESS TO A COMMUNICATION SYSTEM

TECHNICAL FIELD

This invention relates generally to two-way communication systems, and more specifically to access control of such systems, and is more particularly directed toward subscriber authorization procedures to gain access to a two-way communication system.

BACKGROUND ART

Password controlled systems are known. In such systems, access to a resource (such as a central computer) is denied unless a predetermined code (password) is initially provided.

In a two-way communication system, subscribers each have an identification (ID) code, which may be analogized to a simple password control mechanism. Whenever a subscriber desires to communicate, a request (which includes the ID code) may be transmitted to a central location. If the subscriber is authorized (i.e., the ID code is recognized by the system) communication is permitted. Unauthorized (unrecognized) subscribers are denied access to the communication resources. For example, operators of Specialized Mobile Radio (SMR) systems provide a communication service to their subscribers in return for a basic monthly rate (which may also include a variable charge depending upon the amount of "air time" used by each subscriber). Each subscriber is billed for each ID code that the system is programmed to recognize. Generally, each subscriber has unlimited access to the SMR system so long as the service bills are paid.

The need for the present invention grew out of the realization by some SMR operators that some of the subscribers are duplicating (or permitting others to duplicate) the memory device that contains the ID code, and installing the duplicated devices in several radios. In this way, the basic monthly fee per unit is avoided since several subscribers now have the "same" ID code. The loss of revenue to the SMR operators is both significant and growing. Although legal recourse may be available, it is both time consuming and costly. Typically, the SMR operator has invested hundreds of thousands of dollars to provide the communication service, and the additional cost and burden of policing the system may be intolerable.

From the above discussion, it will be apparent that conventional password systems are completely unsuited to address this problem. The fundamental problem with simple password systems is that they presuppose that a subscriber desires to maintain the password in secrecy, thereby assisting in the effort to control who has access to the resource. Accordingly, the addition of a separate password (perhaps entered on a keypad of a radio) would be fruitless since this password could be easily disseminated by those who currently duplicate the ID codes. Further, requiring individuals to enter a password prior to requesting a communication channel goes against the custom and practice of the communication industry, and may be overly burdensome to the subscribers. Thus, a need exists to provide a method for allowing easy access to a communication system, while still providing protection to the operators of such communication systems.

SUMMARY OF THE INVENTION

Accordingly, it is an object of the present invention to provide an improved communication system.

It is another object of the present invention to provide a method for detecting subscriber units having duplicated ID codes.

It is a further object of the present invention to provide a method for denying access to communication services to subscriber units having duplicated ID codes.

Accordingly, these and other objects are achieved in the present method for controlling access to a communication system.

Briefly, according to the invention, all subscribers initially generate and transmit a random password and their ID code to the operation (control) center of a communication system. Thereafter, in a first embodiment, subscribers are commanded to modify (in a predetermined manner) and re-transmit their password and ID code either periodically or upon requesting access to the communication system. After acceptance, the modified password is retained as the current (authorized) password by both the subscriber and the system. In a second embodiment, subscribers are commanded (or optionally determine independently) to generate and transmit a new random password and their ID code to the system, which maintains a history of each subscriber's current and previous passwords. According to the invention, some of the subscribers having an unauthorized (duplicated) ID code may be inactive (off) when the subscriber is commanded to modify or generate a password. In this way, at least one of the subscribers having an unauthorized ID code will become out-of-sync with the system, and eventually transmit an unauthorized password. When the system receives an incorrect password from an out-of-sync subscriber, access to the communication system may be denied, and the subscriber(s) that duplicate (or permit others to duplicate) ID codes may be identified.

BRIEF DESCRIPTION OF THE DRAWINGS

The invention may be understood by reference to the following description, taken in conjunction with the accompanying drawings, in which.

DETAILED DESCRIPTION OF THE PREFERRED EMBODIMENTS

The goal of the present invention is to detect the presence of subscriber units containing an unauthorized (duplicated) identification (ID) code, which may be used to gain access to a two-way communication system. According to the principles of the present invention, the two-way communication system could comprise virtually any communication system in which information flows both from a central location to subscriber units, and from subscriber units back to the central location. Such systems include, but are not limited to, trunked communication systems, cellular telephone communication systems, wireline link computer systems, and the like. In achieving this goal, it is paramount that the present invention afford some protection to ensure against the possibility of "false detection". That is, the present invention must guard against the possibility of designating an authorized subscriber unit as one that has obtained a duplicate ID code, and thus is operating (or attempting to operate) on a communication system in an unauthorized manner.

Since a primary focus of the present invention is to protect the interest of the communication system operator, the action taken upon the detection of an unauthorized subscriber unit is left largely in the hands of the communication service provider. Accordingly, upon detection of an unauthorized subscriber, the ID code that has been duplicated may be denied future communication services. Alternately, a list of any ID codes that have been determined to be unauthorized may be generated. This alternative action provides the system operator with the flexibility to determine whether or not to withhold communication services from a subscriber having an unauthorized ID code.

Fundamentally, the present invention achieves its goals and objects by having each authorized subscriber generate a randomized password, which is stored both in the subscriber unit and the central station or controller of the two-way communication system. The initially randomized password is varied by either generating a new randomized password, or by modifying the initial password to create a new password. Accordingly, the passwords of each individual subscriber unit change on a relatively continuous basis either by command from the central unit, or automatically during events, such as, for example, the initiation by a subscriber unit of a call request (or other request) to use the communication services provided by the two-way communication system. According to the present invention, it is unlikely that every unauthorized subscriber unit would be active (i.e., on and monitoring the communication channels) at all times. Thus, even if an unauthorized subscriber were able to obtain the initial randomized password, and thereafter, were able to keep up with certain modification commands, eventually at least one unauthorized subscriber will be inactive (off) when one or more commands to change or create a new password is received. Thus, at least one unauthorized subscriber will be "out-of-sync" with the current (authorized) password expected by the central controller and contained in the other subscriber units (whether authorized or unauthorized). Accordingly, when the out-of-sync subscriber ultimately re-transmits its password to the communication facilities, the central may easily detect the unauthorized (incorrect) password and determine that an unauthorized subscriber exists.

As will be apparent from the preceding discussion, the present invention operates to permit unauthorized subscribers to have some access to the communication system, preferring to wait until one or more of the unauthorized subscribers becomes confused (i.e., out-of-sync) as to what the current (valid) password actually is. This reduces the possibility of falsely determining that the password is incorrect when, in fact, a correctly transmitted password has been corrupted by noise or other atmospheric disturbances while travelling through the communication channel (be it wireless or wireline). Typically, it is contemplated by the present invention that the period of time required for unauthorized subscribers to become out-of-sync may be as short as 24 hours, or as long as 1 week. In any event, the present invention prefers a more gradual (yet certain) detection of unauthorized subscribers rather than a more ruthless (and error prone) detection mechanism.

Figure 1A:
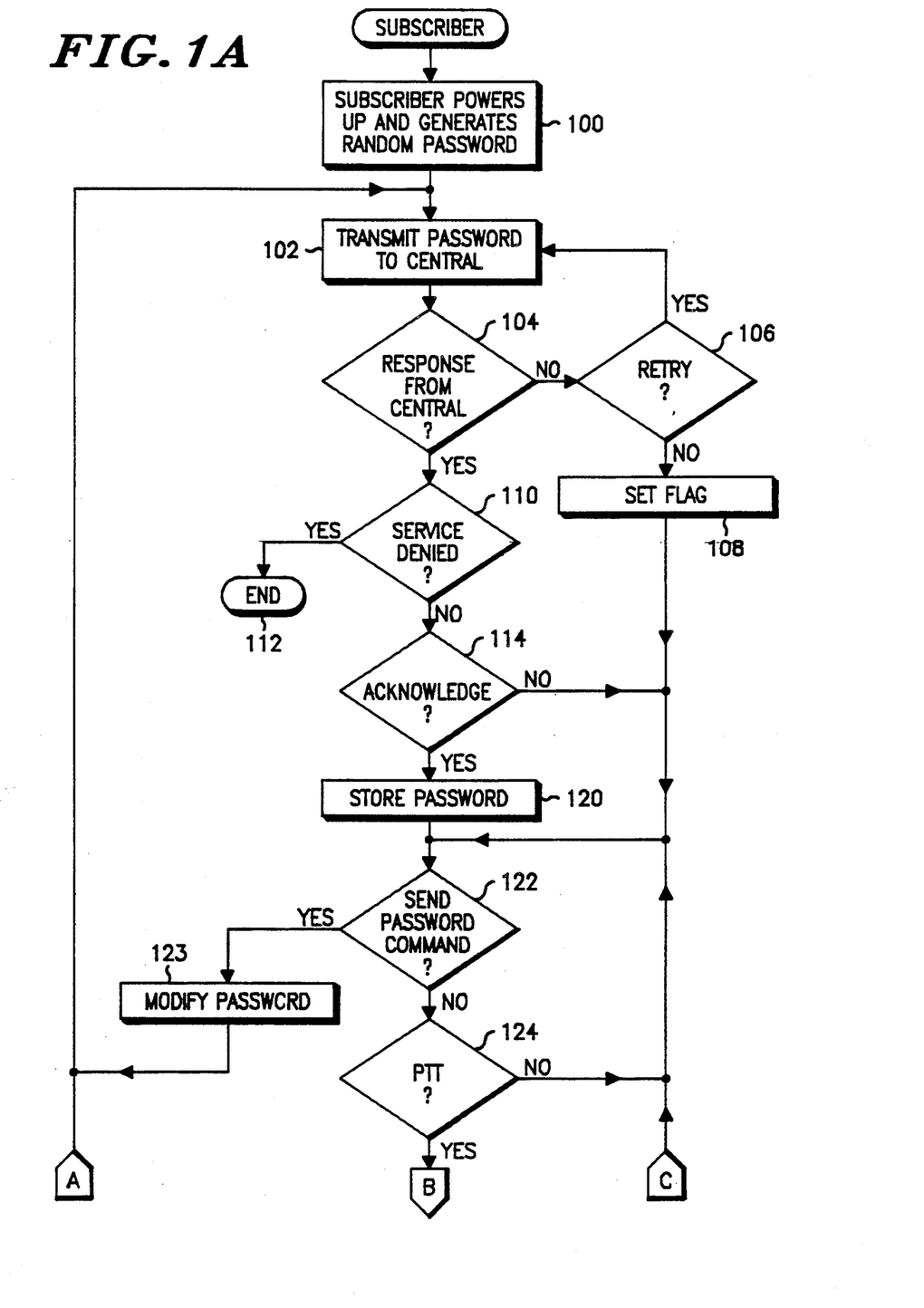
FIGS. 1a and 1b are flow diagrams illustrating the steps executed by subscriber units according to a first embodiment of the present invention.

Referring now to FIG. 1a, the steps executed by a subscriber unit according to a first embodiment of the present invention are shown. In step 100, a subscriber powers up and generates a random (or pseudo-random) password. In step 102, the subscriber unit transmits its password (either new or modified (step 123)) together with its ID code to the system controller (commonly referred to as a central controller or central). Decision 104, determines whether the subscriber has received a response from the central. According to the present invention, the subscriber awaits an "Acknowledge" code from the central indicating that the central has received and cross-referenced the subscriber's ID code to the current password. If the determination of decision 104 is that the subscriber has not received the response from the central, the routine proceeds to decision 106, which determines whether or not is it appropriate for the subscriber to retransmit (retry) the transmission of its password and ID code. Typically, the subscriber will retry a transmission several times after waiting a predetermined time interval. However, after completing several retransmissions, if the subscriber has not received a response the routine proceeds to step 108, where the subscriber unit sets a flag, which records the fact that the password was transmitted. The routine then proceeds to decision 122.

If, however, the determination of decision 104 is that the subscriber has received a response, the routine proceeds to decision 110, which determines whether a "Service Denied" code has been received. If the central has determined that the subscriber is unauthorized, it may transmit a "Service Denied" command code, which will terminate the routine in step 112. Assuming, however, that decision 110 determines that a "Service Denied" code was not received, the routine proceeds to decision 114, which determines whether the expected "Acknowledge" code from the central controller has been received. If not, the routine proceeds to reference letter C. Assuming however that the "Acknowledge" code has been received by the subscriber unit, the routine proceeds to step 120, in which the subscriber units stores the password (either initial or modified) in a suitable memory device. Preferably, the modification of the password comprises incrementing or decrementing the digital code comprising the password by a predetermined amount (for instance, by one) This operates to keep the password changing in a relatively continuous manner.

Decision 122 determines whether the subscriber has received a "Send Password" command from the central. If so, the password is modified (step 123), after which the routine proceeds to step 102, wherein the subscriber retransmits the modified password and its unit ID code. If, however, the determination of decision 122 is that a "Send Password" command has not been received, the routine proceeds to decision 124, which determines whether the individual operating the subscriber unit has activated a push-to-talk (PTT) switch. Ordinarily, the PTT switch automatically initiates a request for the subscriber to gain access to the communication resources. If decision 124 determines that the subscriber does not wish to communicate, the routine proceeds to reference letter C (decision 122). The subscriber will continue to operate in the "loop" formed by decisions 122 and 124 until some action or command has been taken. Of course, the simplified loop embodied by decisions 122 and 124 serve only to illustrate the basic operation of the present invention. It will be understood by those skilled in the art that within this operational loop many other procedures and functions may be performed as are known and existing in the art today. Assuming, however, that decision 124 has determined that the subscriber desires access of the communication resources, the routine proceeds to reference letter B of FIG. 1b.

Figure 1B:
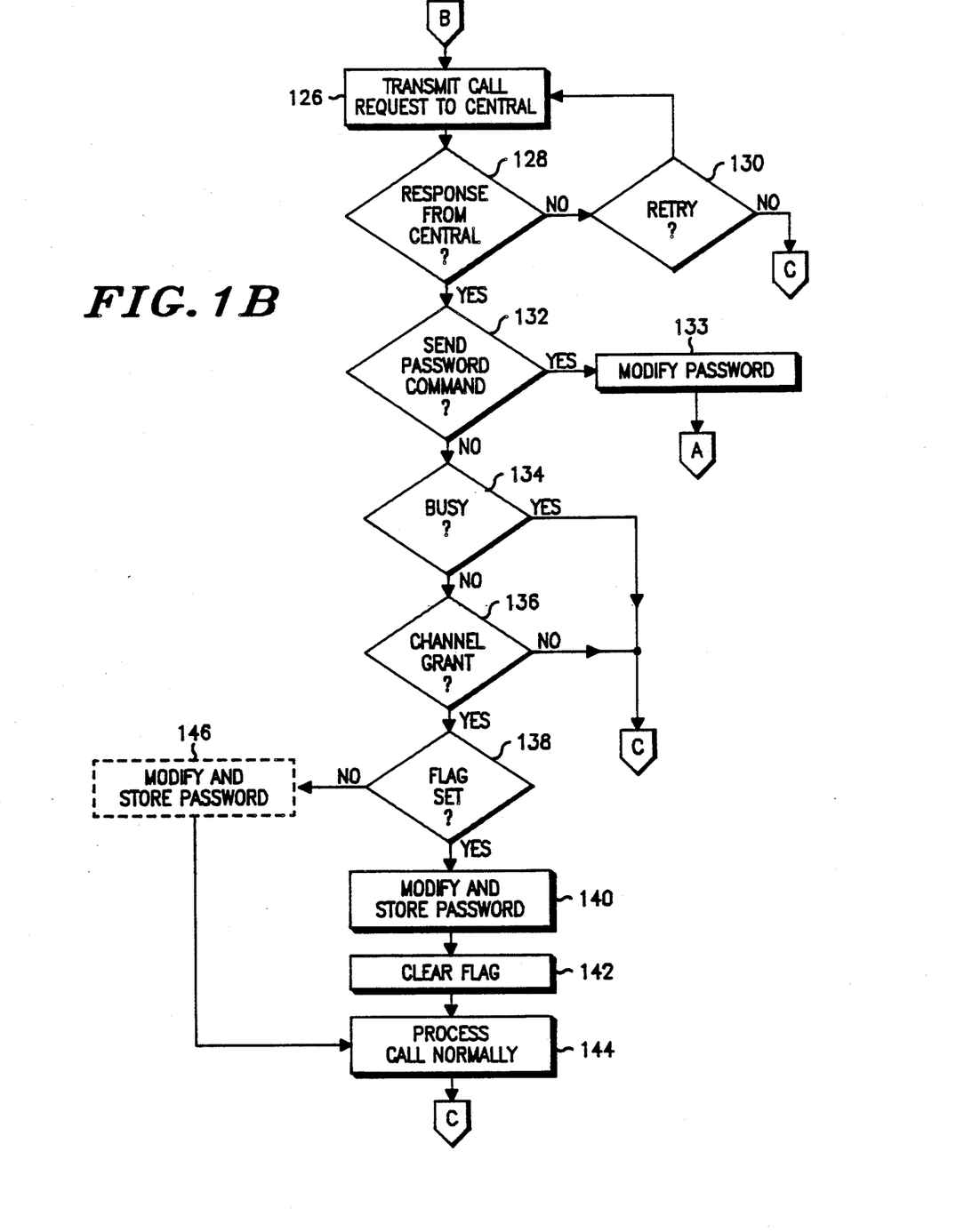

Referring to FIG. 1b, the subscriber unit responds to the activation of the PTT switch by transmitting a call request to the central controller (step 126). Ordinarily, the call request includes the subscriber unit identification code and other information so as to inform the central as to the type of call requested (such as, for example, voice transmission, data transmission, individual call, or group call). Decision 8 determines whether a response has been received from the central. If not, decision 130 determines whether it is appropriate to retransmit (retry) the call request. If not, the routine proceeds to reference letter C. Assuming that the subscriber has received a response, decision 132 determines whether the central has transmitted a "Send Password" command. If so, the password is modified (step 133), and the routine proceeds to reference letter A. Assuming, however, that the subscriber has not received a "Send Password" command, decision 134 determines whether a "Busy" command code has been received by the subscriber. Generally, shared access communication systems (such as, for example, trunked communication systems) allocate a limited and fixed number of channel resources among a plurality of subscriber units. Accordingly, there is a chance that, at any particular time, no communication channels will be available. In such circumstances, the central controller returns a "Busy" command code. Thus, decision 134 routes control to reference letter C if a "Busy" command code is received. However, if the determination of decision 134 is that a busy command code has not been received, the routine proceeds to decision 136, which determines whether the subscriber has received a "Channel Grant" command from the central. If the determination of decision 136 is that a "Channel Grant" has not been received, the routine proceeds to reference letter C. If, however, the central has granted the subscriber's call request and assigned a communication channel for the subscriber to use, the routine proceeds to decision 138, which determines whether the flag indicating that the password was sent is set. An affirmative determination of decision 138 indicates that the subscriber unit was waiting for a response from the central (decision 104). Accordingly, the password (initial or as modified) is stored (step 140) and the flag is cleared (step 142). Following this, the call is processed normally (step 144). However, if the determination of decision 138 is that the flag is not set, the subscriber may optionally modify and store its password (step 146) prior to processing the call (step 144).

Figure 2:
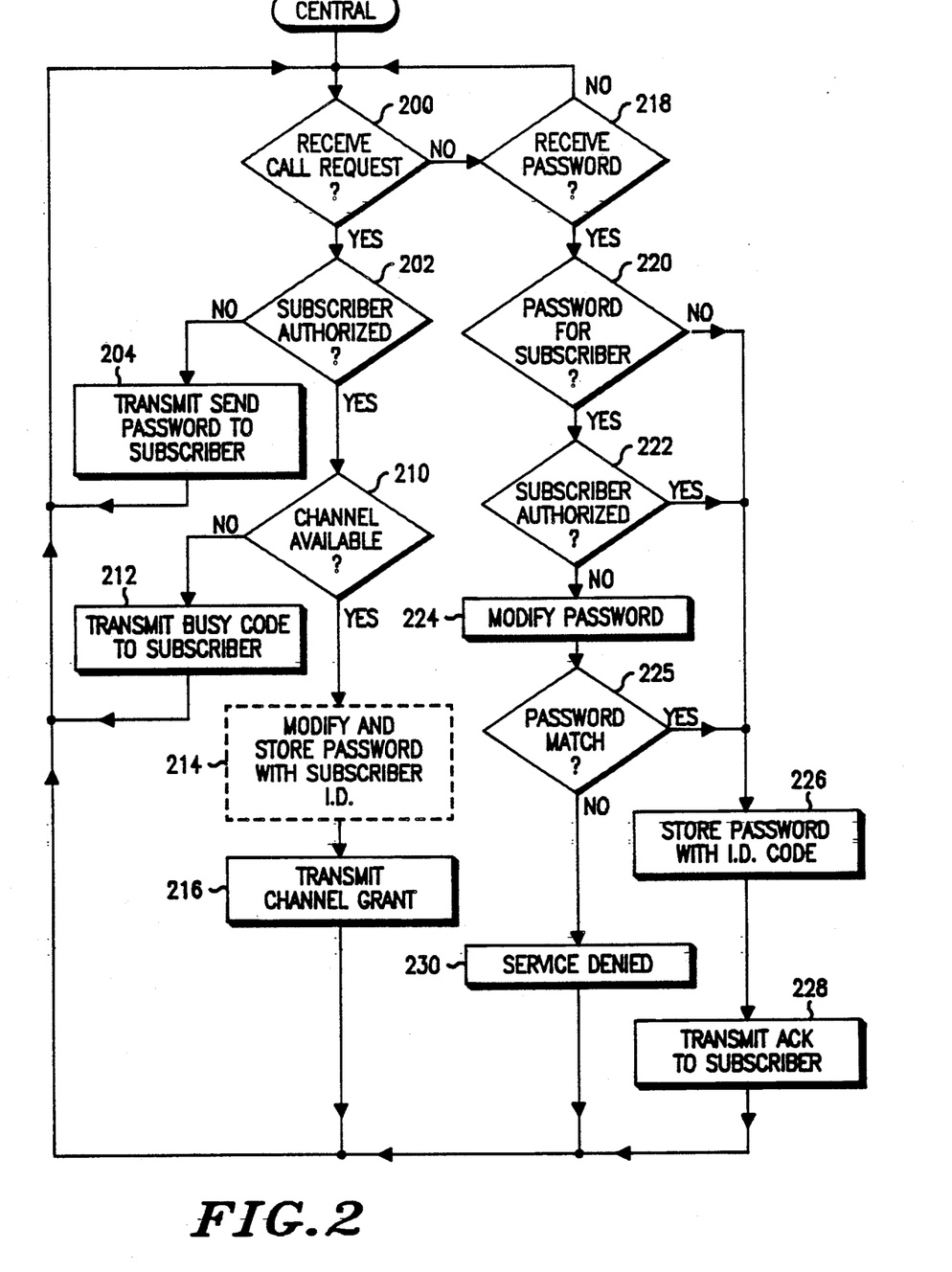
FIG. 2 is a flow diagram illustrating the steps executed by an operational center (central) of a communication system in accordance with a first embodiment of the present invention.

Referring now to FIG. 2, the steps executed by the system central control station (central) according to a first embodiment of the present invention are shown. In decision 200, the central determines whether it has received a call request from a subscriber. If so, decision 202 determines whether the subscriber is currently authorized. According to the present invention, the subscriber would have an unauthorized status if the received call request was the first request received from such subscriber (following an initial power up). Alternately, a subscriber can be moved from an authorized to unauthorized status by the system operator to force a password modification and determine whether other subscribers have unauthorized duplicates of that particular ID code. Lastly, according to the present invention, it is contemplated that a certain subset of all available and authorized subscribers may be reclassified to an unauthorized status to force password modifications in an attempt to detect unauthorized users. The status change from authorized to unauthorized may be performed by the central either at random, or by a selection of those subscriber ID codes that have not had a significant level of communication activity. This latter option forces ID code changes even in the event that a subscriber has not generated a significant amount of call requests, which would automatically force password modifications. Accordingly, the central transmits (step 204) a "Send Password" command to the requesting subscriber unit and returns to decision 200 to await the subscriber's response.

If the determination of decision 202 is that the subscriber is authorized, the routine proceeds to decision 210, which determines whether a channel is available. If not, the routine proceeds to step 212 where a "Busy" code may be transmitted to the subscriber. If, however, the determination of decision 210 is that a channel is available, the routine may proceed to step 214, where the central optionally modifies and stores the subscriber's password (cross-referenced to the subscribers ID code). Of course, for the password system of the present invention to operate correctly, both the central and the subscriber must modify the current (valid) password in the same predetermined way (preferably, by incrementing or decrementing the password by a predetermined amount). Next, step 216 transmits a "Channel Grant" to the subscriber so that communication may proceed. Following this, the routine returns to decision 200.

Assuming now that the determination of decision 200 was that a call request was not received, decision 218 determines whether a password has been received from a subscriber. If the determination of decision 218 is that a password has not been received, the routine returns to decision 200, to await a call request. Of course, other request codes currently known and used may be received and operated upon by the central in any particular embodiment. Assuming now that the determination 218 was that a password has been received (which may be in response to a "Send Password" command), the routine proceeds to decision 220, where the central determines whether a password already exists for that subscriber's ID code. If so, decision 222 determines whether the subscriber unit is authorized. If the subscriber is authorized, the routine proceeds to step 226, which stores the received password. Next, the central transmits an "Acknowledge" code (step 228). If, however, the subscriber is not authorized, the subscriber's stored password is modified (step 224) and the routine proceeds to decision 225, which determine whether the received password and modified password match. If the determination of decision 225 is that the passwords match, the routine proceeds to step 226, which stores the modified password (cross-referenced to the ID code of the subscriber unit) in a suitable memory device. The routine flow from a negative determination of decision 220 to step 226 stems from the realization that if a subscriber unit has transmitted a password without being commanded to do so, it is likely that the subscriber unit has just powered on and is seeking to register an authorized ID code. In step 228, the central transmits an "Acknowledge" code to the subscriber, which will cause the subscriber to correspondingly store its modified password thereby keeping the central and the subscriber "synchronized" as to the current (valid and authorized) password.

Assuming, however, that the determination of decision 225 is that the received password and the modified password do not match, the routine proceeds to step 230, where a "Service Denied" code may be transmitted. Alternately, the central may communicate with a printer (or the like) and list the subscriber ID code that has transmitted the incorrect password. In this way, the system operator may determine whether or not to deny future communication system access.

Preferably, if automatic denial of service is desired by a system operator, the "Service Denied" command code is transmitted upon the first determination that the passwords are incorrect. The reason for this selection results from the fact that the present invention detects unauthorized users gradually rather than by a more ruthless method. In any event, to provide even more gradual detection, the central may have a password mismatch counter, which will count the number of times an incorrect password has been transmitted with a particular subscriber identification code. After a predetermined threshold has been reached, the system operator can be assured that unauthorized users exist.

Figure 3A:
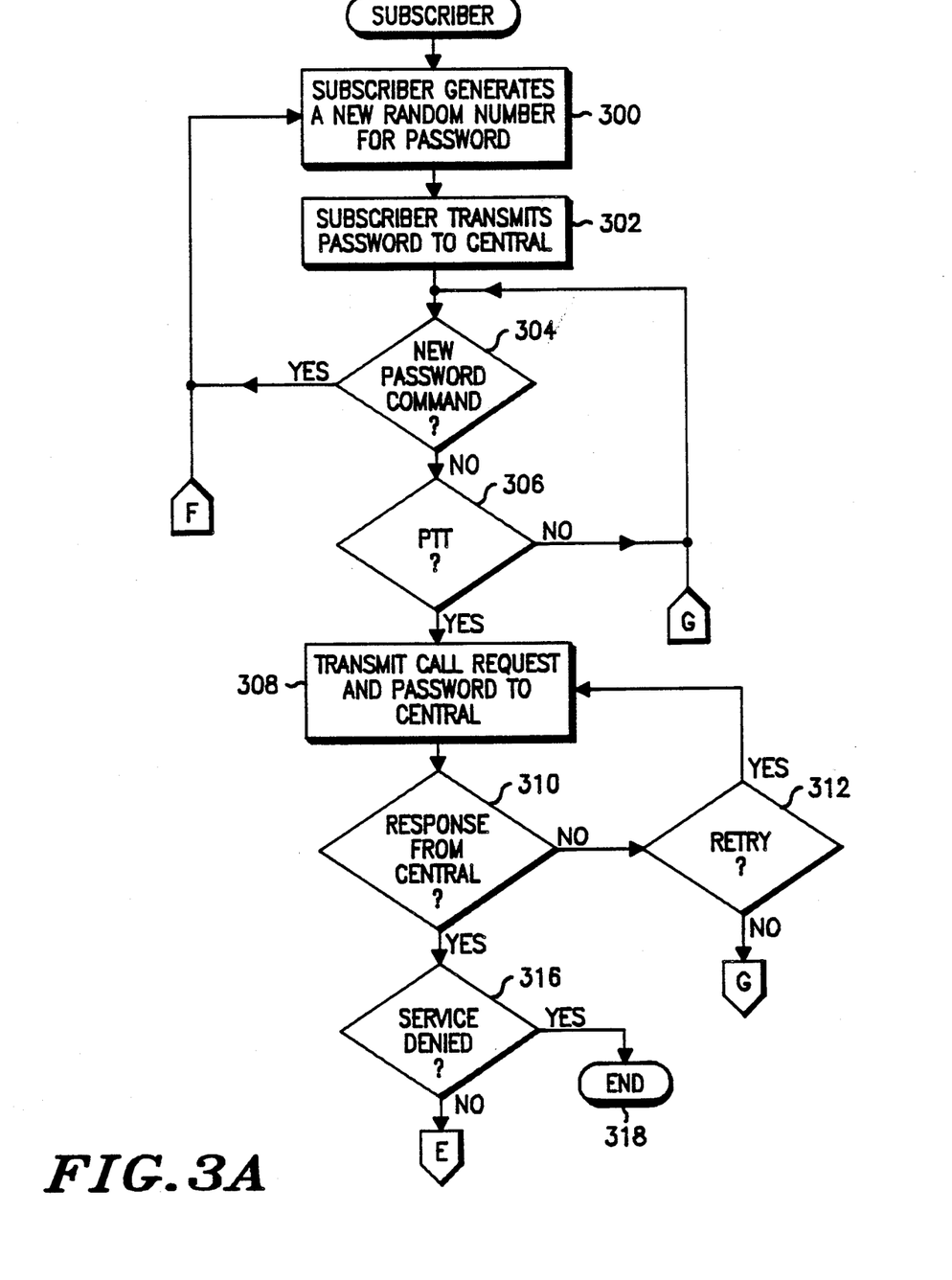
FIGS. 3a and 3b are flow diagrams illustrating the steps executed by subscriber units according to a second embodiment of the present invention.

Referring now to FIG. 3a, the steps executed by a subscriber unit according to a second embodiment of the present invention are shown. In step 300, a subscriber (upon initial power up) generates a random (or pseudo-random) password. In step 302, the subscriber transmits this password together with its ID code to the system controller (commonly referred to as a central controller or central). Decision 304, determines whether the subscriber has received a "New Password" command from the central (optionally, the subscriber unit may itself generate a "New Password" command after the expiration of a timer or upon the occurrence of some event). If so, the routine returns to step 300, where the subscriber unit generates and transmits (step 302) a new random password. If, however, the determination of decision 304 is that the subscriber has not received a "New Password" command from the central, the routine proceeds to decision 306, which determines whether the subscriber has activated its push-to-talk (PTT) switch to initiate a transmission. Ordinarily, the PTT switch automatically initiates a request for the subscriber to gain access to the communication service. If decision 306 determines that the subscriber does not wish to communicate, the routine returns to decision 304. The subscriber unit will continue to operate in the "loop" formed by decisions 304 and 306 until some action or command has been taken. Of course, the simplified loop embodied by decisions 304 and 306 serVe only to illustrate the basic operation of the present invention. It will be understood by those skilled in the art that within this operational loop many other procedures and functions may be performed as are known and existing in the art today.

Assuming that decision 306 has determined that the subscriber desires access of the communication resources, the routine proceeds to step 308, where the subscriber unit transmits a call request and the current password to the central controller. Ordinarily, the call request includes the subscriber's identification code and other information so as to inform the central as to the type of call requested (such as, for example, voice transmission, data transmission, individual call, or group call). Decision 310 determines whether a response has been received from the central. If not, decision 312 determines whether it is appropriate to retransmit (retry) the call request. Typically, the subscriber unit may retry a transmission several times after waiting a predetermined time interval. However, after completing several retransmission, if the subscriber has not received a response the routine proceeds to reference letter G to await a later attempt. If, however, the determination of decision 310 is that the subscriber has received a response, the routine proceeds to decision 316, which determines whether a "Service Denied" code word has been received. If the central has determined that the subscriber is unauthorized, it may transmit a "Service Denied" command code, which will terminate the routine in step 318. Assuming, however, that decision 316 determines that a "Service Denied" code was not received, the routine proceeds to reference letter E of FIG. 3b.

Figure 3B:
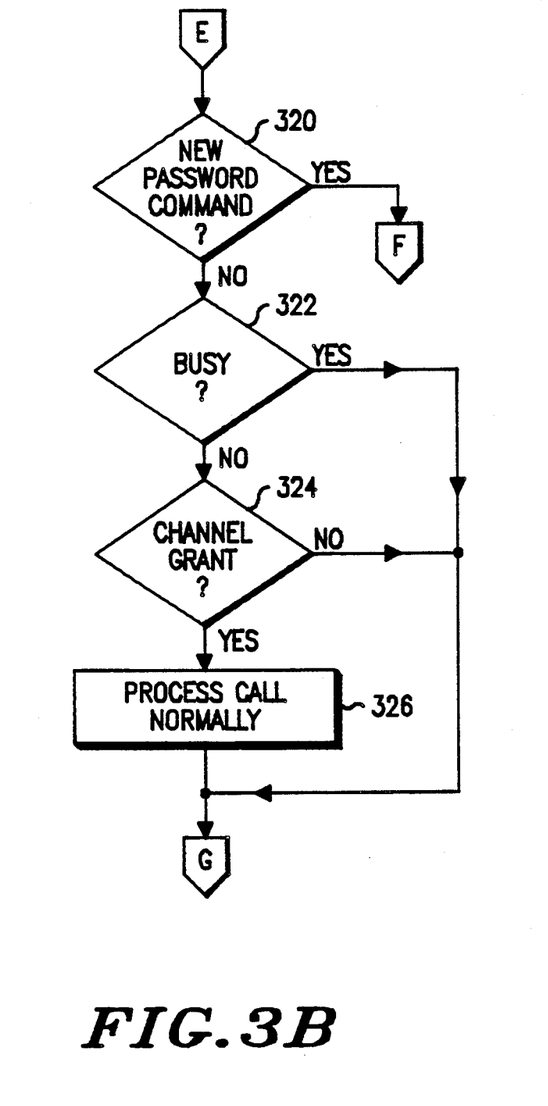

Referring now to FIG. 3b, the routine continues in decision 320, which determines whether the central has transmitted a "New Password" command. If so, the routine proceeds to reference letter F (FIG. 3a). Assuming, however, that the subscriber has not received a "New Password" command, decision 322 determines whether a "Busy" command code has been received by the subscriber unit. Generally, shared access communication systems (such as, for example, trunked communication systems) allocate a limited and fixed number of channel resources among a plurality of subscriber units. Accordingly, there is a chance that, at any particular time, no communication channels will be available. In such circumstances, the central controller returns a "Busy" command code. Thus, decision 322 routes control to reference letter G (FIG. 3a) if a "Busy" command code is received. However, if the determination of decision 322 is that a "Busy" command code has not been received, the routine proceeds to decision 324, which determines whether the subscriber has received a "Channel Grant" command from the central. If the determination of decision 324 is that a "Channel Grant" has not been received, the routine proceeds to reference letter G (FIG. 3a). If, however, the central has granted the subscriber's call request and assigned a communication channel for the subscriber to use, the routine proceeds to step 326, where the subscriber unit processes the call normally, after which, the routine proceeds to reference letter G (FIG. 3a).

Figure 4:
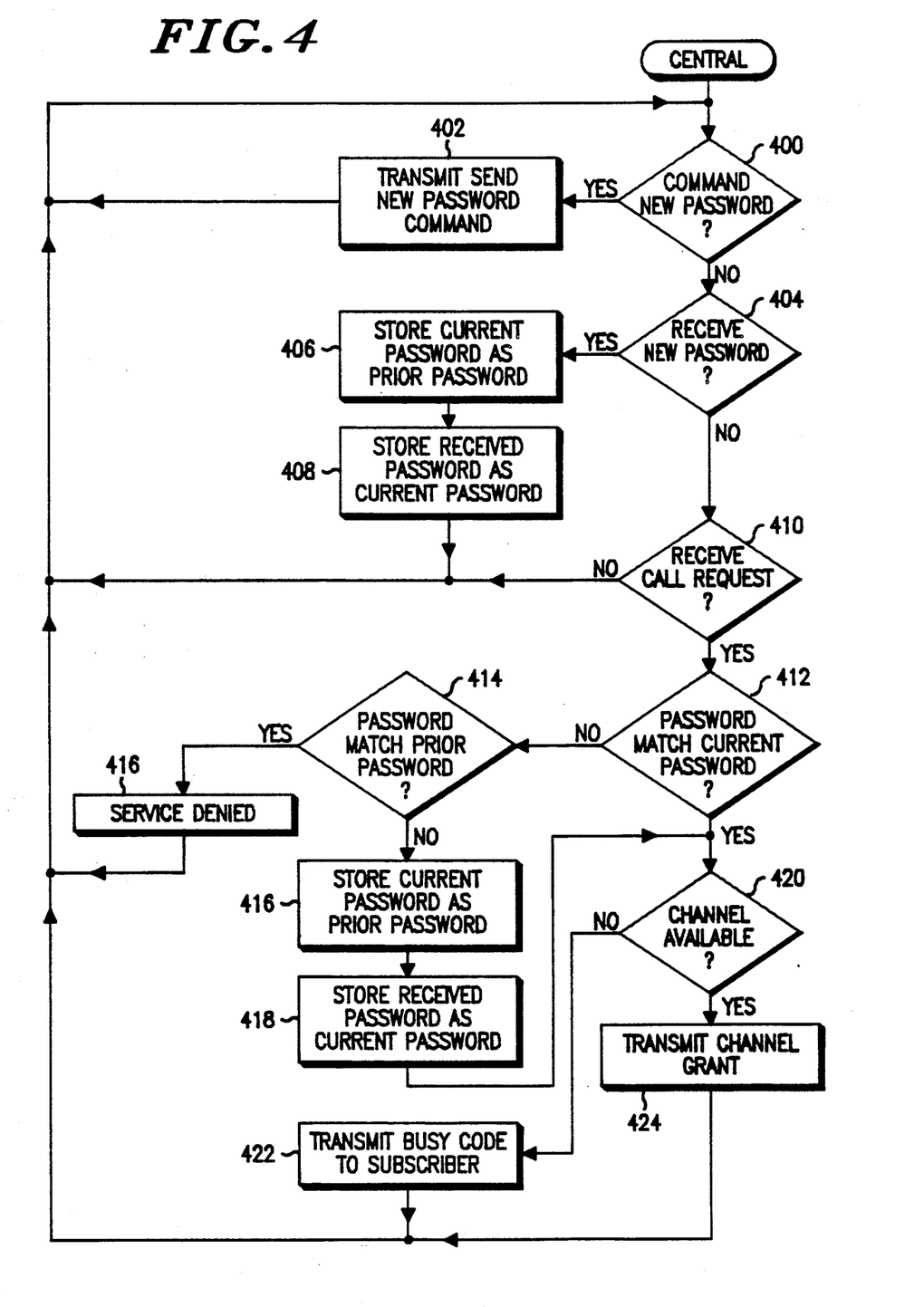
FIG. 4 is a flow diagram illustrating the steps executed by an operational center (central) of a communication system in accordance with a second embodiment of the present invention.

Referring now to FIG. 4, the steps executed by the system central control station (central) according to a second preferred embodiment of the present invention are shown. In decision 400, the central determines whether to command a subscriber unit to generate and transmit a new password. If so, step 402 transmits a "New Password" command to the subscriber unit. A negative determination of decision 400 causes the routine to proceed to decision 404, which determines whether the central has received a new password from a subscriber unit. Typically, an affirmative determination of decision 404 occurs when a subscriber initially powers up and transmits a newly generated password. Optionally the subscriber unit may have automatically generated a new password after the expiration of a timer or the occurrence of some event. Accordingly, if the determination of decision 404 is that a new password has been received, the routine proceeds to step 406, where the current password (in any) is reassigned as a prior password to make room for the new (current) password. The new password is then stored as the current (authorized) password in step 408. Following this, the routine returns to decision 400.

Decision 410 determines whether the central has received a call request. If not, the routine returns decision 400. However, if the determination of decision 410 is that a call request has been received, the routine proceeds to decision 412, which determines whether the subscriber's current (authorized) password correlates (matches) the received password. The matching (or correlation) of the passwords by the present invention consists of a bit-by-bit comparison requiring 100% correspondence. If the determination of decision 412 is that the passwords do not match, the routine proceeds to decision 414, which determines whether the received password correlates with the subscriber's prior password. Preferably, the present invention stores only the last prior password as the prior password. Alternately, if the central has suitable memory capacity, several prior passwords may be stored for each subscriber ID. In such a case, decision 414 would determine whether the received password matched any of the prior passwords. If the determination of decision 414 is that the received password and prior password correlate the routine proceeds to step 416, where a "Service Denied" command code may be transmitted to the subscriber. Alternately, the central may communicate with a printer (or the like) and list the subscriber ID code that has transmitted the incorrect password. This way, the system operator may determine whether or not to deny future communication system access.

Preferably, if automatic denial of service is desired by a system operator, the "Service Denied" command code is transmitted upon the first determination that the passwords are incorrect. The reason for this selection results from the fact that the present invention detects unauthorized users gradually rather than by a more ruthless method. In any event, to provide even more gradual detection, the central may have a password mismatch counter, which will count the number of times an incorrect password has been transmitted with a particular subscriber identification code. After a predetermined threshold has been reached, the system operator can be assured that unauthorized users exist and are transmitting the incorrect password.

Assuming now that the determination of decision 414 is that the received password does not correlate to the subscriber's prior password, the routine proceeds to step 418, where the current password is reassigned as a prior password. Next, in step 418, the received password is stored as the current (authorized) password and the routine proceeds to decision 420. These steps of the central's routine provide protection for an authorized subscriber that has lost the current password through some error. Thus, if the received password does not match the current password (decision 412), the central may allow the subscriber access so long as the received password does not match a prior password (decision 414). Of course, the central may also monitor how often a subscriber transmits a new password that does not match either the current or a previous password. Thus, if a subscriber attempted to circumvent the access protection afforded by the present invention by continually generating new passwords, the central may detect this occurrence and alert the system operator.

If the determination of decision 412 is that the received password matches the current password, or if the determination of decision 414 is that the received password did not match the subscriber's prior password, the routine proceed to decision 420, which determines whether a channel is available. If not, the routine proceeds to step 422 where a "Busy" code may be transmitted to the subscriber. If, however, the determination of decision 420 is that a channel is available, the routine proceeds to step 424, where the central transmits a "Channel Grant" to the subscriber so that communications may proceed.

What is claimed is:

1. In a two-way communication system having a central unit and a plurality of subscriber units each having at least an identification code stored therein, a method of controlling access to the two-way communication system comprising the steps of:

in at least one of said plurality of subscriber units:
(a) generating a first random number as a first password code;
(b) transmitting at least said first password code and said identification code;
(c) receiving a command code and generating a second random number as a second password code in response thereto;
(d) transmitting at least said second password code and said identification code.

2. In a two-way communication system having a central unit and a plurality of subscriber units each having at least an identification code and a first password code stored therein, a method of controlling access to the two-way communication system comprising the steps of:

(a) transmitting at least a call request code;
(b) receiving a command code and generating a random number as a second password code in response thereto;
(c) transmitting at least said second password code and said identification code; and
(d) receiving a channel grant code.

3. In a two-way communication system having a central unit and a plurality of subscriber units each having at least an identification code and a first password code stored therein, a method of controlling access to the two-way communication system comprising the steps of:

in at least one of said plurality of subscriber units:
(a) receiving a command code and generating a random number as a second password code in response thereto;
(b) transmitting at least said second password code and said identification code.

4. In a two-way communication system having a central unit and a plurality of subscriber units each having at least an identification code stored therein, a method of controlling access to the two-way communication system comprising the steps of:

in at least one of said plurality of subscriber units:
(a) generating a first random number as a first password code;

(b) transmitting at least said first password code and said identification code;
(c) receiving a command code and generating a second random number as a second password code in response thereto;
(d) transmitting at least said second password code and said identification code;

at said central unit;
(a) receiving said first password code;
(b) transmitting said command code;
(c) receiving said second password code.

5. In a two-way communication system having a plurality of subscriber units each having at least an identification code and a first password code stored therein and at least one central unit designating said first password code as a current password code, a method of controlling access to the two-way communication system comprising the steps of:

in at least one of said plurality of subscriber units;
(a) transmitting at least a call request code;
(b) receiving a command code and generating a random number as a second password code in response thereto;
(c) transmitting at least said second password code and said identification code; and
(d) receiving a channel grant code, at said at least one central unit:
(a) receiving at least said call request code;
(b) transmitting said command code;
(c) receiving at least said second password code;
(d) determining whether said second password correlates to a current password;
(e) granting access to said two-way communication system if said second password correlates to said current password.

6. In a two-way communication system having a central unit and a plurality of subscriber units each having at least an identification code and a first password code stored therein, a method of controlling access to the two-way communication system comprising the steps of:

in at least one of said plurality of subscriber units:
(a) receiving a command code and generating a random number and a second password code in response thereto;
(b) transmitting at least said second password code and said identification code;

at said central unit;
(a) transmitting said command code;
(b) receiving at least said second password code.

7. In a two-way communication system having a central unit and a plurality of subscriber units each having at least an identification code stored therein, a method of controlling access to the two-way communication system comprising the steps of:

in at least one of said plurality of subscriber units:
(a) generating a first random number as a first password code;
(b) transmitting at least said first password code and said identification code;
(c) generating a second random number as a second password code in response to a control signal;
(d) transmitting at least said second password code and said identification code; and,
(e) receiving a channel grant code.

8. In a two-way communication system having a central unit and a plurality of subscriber units each having at least an identification code stored therein, a method of controlling access to the two-way communication system comprising the steps of:

in at least one of said plurality of subscriber units:
(a) generating a first random number as a first password code;
(b) transmitting at least said first password code and said identification code;
(c) generating a second random number as a second password code in response to a control signal;
(d) transmitting at lest said second password code and said identification code; and
(e) receiving a channel grant code;

at said central unit:
(a) receiving said first password code;
(b) receiving said second password code.

9. The method of claim 4 or 8, which includes the central unit steps of:
(a1) storing said first received password code, and operating thereafter using said first received password code as a current password code;
(c) storing said second received password code, and operating thereafter using said first received password code as a previous password code, and using said second received password code as said current password code.

10. The method of claims 5 or 6, which includes the central unit step of: (c1) storing said second received password code, and operating thereafter using said first received password code as a previous password code, and using said second received password code as a current password code.

11. The method of claim 5 or 8, which includes the central unit step of: (c) transmitting a channel grant code.

12. The method of claim 4 or 8, which includes the central unit steps of:
(a1) storing said first password code as a current password;
(c) storing said first password code as a prior password; and,
storing said second password code as said current password.

13. In a two-way communication system having a plurality of subscriber units each having at least an identification code and a first password code stored therein and at least one central unit designating said first password code as a current password code, a method of controlling access to the two-way communication system comprising the steps of:

in at least one of said plurality of subscriber units;
(a) transmitting at least said call request code;
(b) receiving a command code and generating a second password code in response thereto;
(c) transmitting at least said second password code and said identification code;

at said at least one central unit;
(a) receiving at least said call request code;
(b) transmitting said command code;
(c) receiving at least said second password code;
(d) determining whether said second password correlates to a current password;
(e) determining whether said second password correlates to a prior password;
(f) granting access to said two-way communication system when said second password correlates with said current password or does not correlate to said prior password and does not correlate to said current password, else denying access to said two-way communication system.

14. In a two-way communication system having a plurality of subscriber units each having at least an identification code and a first password code stored therein and at least one central unit having stored therein at least one current password and at least one prior cross-referenced to said identification codes of said plurality of subscriber units, a method of controlling access to the two-way communication system comprising the steps of:

at said at least one central unit:

(a) receiving at least a password code and an identification code to provide a received password;
(b) determining whether said received password correlates to a current password;
(c) determining whether said received password correlates to a prior password;
(d) granting access to said two-way communication system if said received password correlates to said current password or does not correlate to said prior password and does not correlate to said current password, else denying access to said two-way communication system.

* * * * *

UNITED STATES PATENT AND TRADEMARK OFFICE
CERTIFICATE OF CORRECTION

PATENT NO. : 4,992,783

DATED : Feb. 12, 1991

INVENTOR(S) : Kenneth J. Zdunek, Philip A. Bieri, Eric R. Schorman

It is certified that error appears in the above-identified patent and that said Letters Patent is hereby corrected as shown below:

At column 10, Line 41, insert after "of:" --in at least one of said plurality of subscriber units:--

At column 11, Line 44, "and" should be --as--.

Signed and Sealed this

Fifteenth Day of September, 1992

*Attest:*

DOUGLAS B. COMER

*Attesting Officer*     *Acting Commissioner of Patents and Trademarks*